United States Patent Office 3,694,252
Patented Sept. 26, 1972

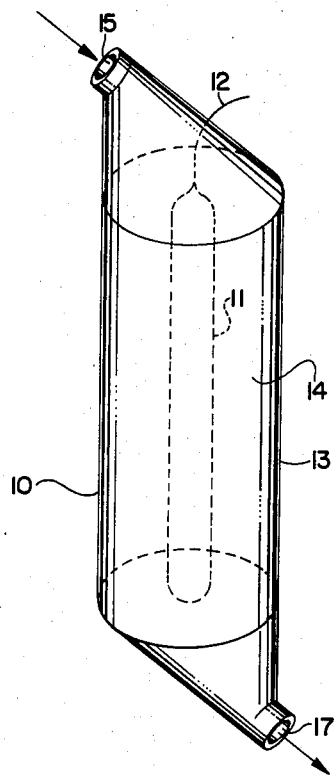

3,694,252
METHOD OF FORMING CAPSULES OF POLYMER COATED SILVER HALIDE GRAINS
Arthur M. Gerber, Boston, Sybil N. Story, Cambridge, and Vivian K. Walworth, Concord, Mass., assignors to Polaroid Corporation, Cambridge, Mass.
Filed May 19, 1971, Ser. No. 144,755
Int. Cl. B44d 1/20
U.S. Cl. 117—93                                    18 Claims

ABSTRACT OF THE DISCLOSURE

This application is directed to a method for preparing microcapsules comprising a nucleus of silver halide surrounded by a continuous wall of a synthetic polymer, which method comprises subjecting the reactants including monomer and silver halide grains in an electrolyte to an electric field between a pair of electrodes whereby the monomers preferentially polymerize around the silver halide.

BACKGROUND OF THE INVENTION

U.S. application Ser. No. 115,985, filed Feb. 17, 1971, discloses and claims novel microcapsules which comprise a continuous synthetic polymeric layer surrounding a nucleus of photosensitive silver halide. The polymer wall layer is of sufficient thickness and rigidity to prevent the agglomeration or formation of clusters of the silver halide crystals, but sufficiently permeable to permit the ready diffusion therethrough of processing composition. Polymerization is carried out under conditions whereby the silver halide provides the sole catalytic sites. The reactants are employed under relatively dilute conditions. Under the process defined in Ser. No. 115,985, substantially no free polymer is produced in the preparation of the capsules, that is, polymer formation is preferentially associated with the silver halide crystals.

The precent invention is directed to an alternative method of making silver halide capsules.

SUMMARY OF THE INVENTION

The present invention is directed to a method of making capsules with a nucleus of photosensitive silver halide which comprises subjecting monomer, silver halide crystals and other optional reactants, in an electrolyte, to an electric field between a pair of electrodes. Selective polymerization of the monomer occurs around the silver halide crystal in the electrolyte cell.

BRIEF DESCRIPTION OF THE DRAWING

The figure is a schematic side elevational view showing one method of preparing the capsules within the scope of the present invention.

DETAILED DESCRIPTION OF THE INVENTION

The present invention is directed to a method of preparing capsules which comprises providing a mixture of monomer and silver halide and subjecting said mixture to an electric field between a pair of electrodes, in an electrolytic cell, thereby providing selective polymerization around said silver halide crystals. The thus-formed capsules comprise a silver halide nucleus with a continuous polymeric wall surrounding said nucleus of a sufficient rigidity and thickness to spatially separate the individual silver halide grains, thus preventing agglomeration of the silver halide and permitting the photographic utility of such capsules as disclosed in Ser. No. 115,985.

Thus, in the practice of the present invention, a mixture of the reactants is disposed between a pair of electrodes in an electrolytic cell and an electric field is applied to said mixture, initiating polymerization of monomer at the surface of the silver halide grain, thus encapsulating the individual silver halide grains in a continuous polymeric layer.

While the reactant mixture may be disposed in a stationary reaction zone in the cell, it is preferred, for efficiency, that the reactants flow between the electrodes. In a particularly preferred embodiment, the reaction zone comprises the space between the walls of a tube which constitutes the first electrode and a second electrode disposed within the tube. Preferably, the tube is disposed in a vertical position so that capsule formation occurs by flowing the reactants through the tube while a voltage is applied to the electrodes, thus providing the encapsulated product at the outlet of the reaction zone, as well as excess starting materials which can be separated.

Subsequent to removal from the reaction zone, the capsules may be washed and employed in the desired photographic configuration.

The strength of the electric field may vary over a wide range. It is only necessary that sufficient current be applied to the electrodes to set off the polymerization reaction. The specific electric field employed will be determined with respect to the monomeric system employed and the space between the electrodes.

The silver halides which are particularly useful in the present invention comprise silver chloride, silver chlorobromide, silver bromide, silver iodobromide, silver iodochlorobromide and combinations thereof, which are conventionally employed in photosensitive elements. The silver halides employed in the process of the present invention may be obtained in the form of conventional silver halide emulsions or they may be composed of silver halides in the form of aqueous suspensions and precipitating the silver halides in the absence of a conventional binder material. Thus, in short, silver halide grains from any suitable source prepared from any conventional method may be employed in the present invention without regard to size or shape.

In order to enhance the polymerization reaction at the surface of the grain, it is preferred to remove any excess bromide ion from the polymerizing medium by, for example, treating the silver halide emulsion with an ion exchange resin.

As stated above, the silver halide employed may be obtained from conventional photographic silver halide emulsions such as gelatin emulsions. If desired, the bulk of the binder material may be removed. However, it is not necessary for the process of the present invention. It should be understood that if the bulk of the binder material is removed, a relatively thin coating of gelatin may surround the silver halide grain over which polymerization occurs. It has been found that the presence of either the relatively thin film or the presence of the bulk gelatin or other binder material exerts little, if any, significant effect on the polymerization of the monomeric material around the silver halide grains.

The term "polymer" as used herein is intended to include polymers prepared from single monomers or copolymers prepared from two or more monomers. It should be further understood that the entire thickness of the polymeric layer may be composed of more than a single polymeric entity. Thus, the polymeric layer may be built up to a certain thickness of a single polymer, and then polymerization continued with different monomers to provide the remainder of the wall layer with a polymeric composition different from that of the initial layer. Preferably, the polymer is insoluble in the polymerizing medium, but is prepared from a monomer which is soluble in said medium.

The thickness of the polymeric wall layer is not critical. It is only necessary that the polymeric layer be of sufficient thickness and rigidity to spatially separate and isolate the individual encapsulated silver halide grains from each other to prevent clumping and to permit the uniform distribution of the silver halide in forming a photographic product. Thus, the thickness of the polymeric layer may vary over a relatively wide range. For example, for a silver halide grain one micron in diameter, a skin thickness ranging from 0.01 micron to 50 microns, and preferably 0.5 micron, may be employed.

Turning now to the drawing, the figure shows a cross-sectional elevational view of an apparatus suitable for carrying out the process of the present invention.

First electrode 10 comprises a tube of suitable conducting material connected to a source of current through lead 13. Spaced within said tube is second electrode 11, e.g., silver, connected to an electrical source through lead 12. Suitable insulating means (not shown) prevent contact and resultant short circuit between electrodes. Reactants, including monomer and silver halide, are fed into the tube through inlet 15, pass through reaction zone 14 where they are subjected to the electric field, inducing preferential polymerization around the silver halide grains. The thus-formed capsules exit the reaction zone through outlet 17 where they can be separated from excess reactants and collected.

The reactants are preferably disposed in a suitable solvent which also constitutes the electrolyte for ease of distribution within the reaction zone. The preferred solvent is water saturated with silver halide.

If desired, various photographic or processing reagents may be incorporated into the capsule, disposing the given reagents in the monomer solution prior to polymerization. Upon formation of the polymer wall around the silver halide crystal, the reagents will be disposed within the wall. As examples of reagents which may be disposed therein, mention may be made of light filtering dyes, dye precursors, such as color couplers, dye developers, developing agents, mordanting groups, silver halide precipitating agents, antifoggants, and the like. In addition to the entrained dyes, polymeric dyes may also be employed, e.g., dyes containing a vinyl substituent may be copolymerized into the wall.

The following non-limiting example illustrates the novel process of the present invention.

Example

A 50 g. silver iodobromide emulsion (18.4% silver, 3.5% gelatin, 0.8 micron in diameter) was treated to remove excess bromide ion by suspending 5 g. of a strong base anion exchange resin (as the hydroxide) Dowex 21K in a silk bag in the emulsion for 1½ hours. At the end of that time the pBr was >7.

A mixture comprising 10 ml. of water, 0.2 gm. acrylamide, 1.8 g. diacetone acrylamide, 2 ml. of the emulsion and 2 ml. of an amphoteric surfactant of the formula:

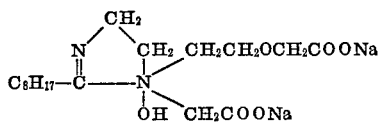

was flowed between vertical electrodes composed of a silver tube having a silver electrode disposed within said tube. The distance between electrodes was 6 mils. 3.65 v. and 0.1 amp was applied to the mixture. Uniform capsules were produced comprising grains 0.8 micron in diameter having a 0.4 micron layer of polymer thereon of sufficient rigidity to prevent agglomeration of grains.

It is believed that the electric field generates a halogen, e.g. bromine radical, at the surface of the grain thus inducing preferential polymerization around the grain. The thickness of the polymer wall is determined by the strength of the field and length of the passage between the electrodes. It is preferred that the voltage employed is between 3.5 and 4 since less than the lower value requires a relatively long polymerization zone, i.e. relatively long residence time, and values in excess of the upper value may promote other, undesirable reactions.

Any suitable monomer capable of polymeriaztion catalyzed by silver halide may be employed in the present invention. Thus, ethylenically unsaturated monomers capable of forming polymers which are permeable to processing composition are suitable for the forming of the walls of the capsules of the present invention. As examples of suitable monomers, mention may be made of acrylamide, diacetone acrylamide, 2-acrylamido-2-methyl-propane sulfonic acid, p-styrene sulfonamide, 1-vinyl chloride, acrylonitrile, styrene, dienes such as butadiene, ethylene and propylene. In an optical embodiment, porosity enhancing materials such as silica and diatomaceous earth may be incorporated into the polymeric layer to provide greater permeability to the capsule wall.

In a preferred embodiment, a monomer or combination of monomers is selected to provide the desired permeability to processing reagents in subsequent photographic employment, but sufficient rigidity to maintain the spacing of the grain.

The electric field may result in the reduction of some of the silver halide employed in the formation of the capsules. Thus, it is contemplated that the present invention include the optional step of contacting the thus-formed capsules with a suitable oxidizing agent, such as potassium ferricyanide or other oxidizing agent known to the art.

In the event that any reduction of the photosensitive silver halide occurs as a result of the applied electric field, it may be desirable to contact the thus-formed capsules with a suitable oxidizing agent such as potassium ferricyanide.

It is preferred that the particular oxidizing agent employed be one which will be readily removable from the capsules, as by washing, so that the silver halide will not be again reduced subsequent to exposure in a photographic system.

It should be understood that the oxidizing step is not necessary if the emulsion employed is a direct positive emulsion.

In an alternative embodiment, in order to avoid the necessity of any subsequent oxidation step, a so-called fading latent image emulsion may be employed. In such an emulsion, the latent image in the silver halide fades over a relatively short period of time. Thus, any exposure of the silver halide during the polymerization process will be taken care of by the passage of time and the silver halide will again be available for the recordation of an image. Subsequent processing of the exposed silver halide must be carried out before the latent image fades. However, such processing generally occurs relatively soon after exposure in silver diffusion transfer processes such as those disclosed in application Ser. No. 115,985. The particular life of the latent image may be determined at the option of the operator by the selection of the appropriate silver halide emulsion.

Such fading latent image emulsions are conventional and disclosed in the art, for example, in Photographic Science and Engineering, Vol. 11, Number 3, pp. 178–180, May-June 1967.

What is claimed is:

1. A method of forming capsules of polymer coated silver halide grains which comprises subjecting a mixture of a monomer, photosensitive silver halide grains and electrolyte to an electric field between a pair of electrodes and removing the thus-formed capsules.

2. A method as defined in claim 1 wherein said monomer is a vinyl monomer and said silver halide comprises a gelatin-silver halide emulsion.

3. A method as defined in claim 2 wherein said monomer is soluble in the reaction medium and the thus-formed polymer is insoluble in the reaction medium.

4. A method as defined in claim 2 wherein the pBr of said emulsion is greater than 7.

5. A method as defined in claim 1 wherein said electric field is between 3.5 and 4.0 volts.

6. A method as defined in claim 1 wherein said mixture includes a surfactant and water.

7. A method as defined in claim 1 which includes the step of oxidizing the silver halide subsequent to formation of the capsules.

8. A method as defined in claim 1 wherein said silver halide is optically sensitized.

9. A method as defined in claim 1 wherein said silver halide is chemically sensitized.

10. A method as defined in claim 1 wherein said silver halide is panchromatically sensitized.

11. A method as defined in claim 1 wherein said layer includes a color providing substance.

12. A method as defined in claim 1 wherein said monomer is diacetone acrylamide.

13. A method as defined in claim 1 wherein said monomer is para-styrene sulfonamide.

14. A method as defined in claim 1 wherein said monomer is 1-vinylimidazole.

15. A method as defined in claim 1 wherein said monomer comprises acrylamide and 2-acrylamido-2-methylpropane sulfonic acid.

16. A method as defined in claim 1 wherein said silver halide is between 0.1 and 10 microns in diameter.

17. A method as defined in claim 16 wherein said silver halide is 0.8 micron in diameter.

18. A method as defined in claim 1 wherein said mixture includes a dye.

References Cited
UNITED STATES PATENTS

| | | | |
|---|---|---|---|
| 3,322,556 | 5/1967 | Munder et al. | 117—34 |
| 3,386,851 | 6/1968 | Harlan | 117—93.31 |
| 3,518,111 | 6/1970 | Wright et al. | 117—93.31 |
| 3,519,593 | 7/1970 | Bolger | 117—100 B |
| 3,556,795 | 1/1971 | Hughes et al. | 117—34 |
| 3,558,759 | 1/1971 | Sarem | 264—5 |
| 3,639,257 | 2/1972 | Harbort | 117—100 B |

ALFRED L. LEAVITT, Primary Examiner

J. H. NEWSOME, Assistant Examiner

U.S. Cl. X.R.

96—94, 114; 117—34, 100 B; 264—7, 10